(12) United States Patent
Ozaki et al.

(10) Patent No.: US 8,599,314 B2
(45) Date of Patent: Dec. 3, 2013

(54) DISPLAY DEVICE, PROGRAM, AND STORAGE MEDIUM

(75) Inventors: Michiharu Ozaki, Osaka (JP); Takamasa Shimizu, Osaka (JP); Takayuki Suzuki, Osaka (JP); Eriko Iguchi, Osaka (JP); Aya Minehara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 17 days.

(21) Appl. No.: 13/497,474

(22) PCT Filed: Sep. 24, 2010

(86) PCT No.: PCT/JP2010/066562
§ 371 (c)(1),
(2), (4) Date: Mar. 21, 2012

(87) PCT Pub. No.: WO2011/037188
PCT Pub. Date: Mar. 31, 2011

(65) Prior Publication Data
US 2013/0070164 A1    Mar. 21, 2013

(30) Foreign Application Priority Data
Sep. 25, 2009   (JP) ................................. 2009-221465

(51) Int. Cl.
*H04N 5/445* (2011.01)
*H04N 5/50* (2006.01)

(52) U.S. Cl.
USPC ............................. 348/564; 348/569; 725/43

(58) Field of Classification Search
USPC ................ 348/553–570; 715/808; 725/39–61
See application file for complete search history.

(56) References Cited

U.S. PATENT DOCUMENTS

| 5,287,448 | A  | * | 2/1994  | Nicol et al. ................... 715/707 |
| 5,969,748 | A  | * | 10/1999 | Casement et al. .............. 725/27  |
| 6,469,711 | B2 | * | 10/2002 | Foreman et al. .............. 715/723 |
| 2007/0200856 | A1 | | 8/2007 | Tashiro |
| 2009/0024958 | A1 | | 1/2009 | Itou |
| 2010/0088634 | A1 | | 4/2010 | Tsuruta et al. |

FOREIGN PATENT DOCUMENTS

| JP | 10-200846 A    | 7/1998 |
| JP | 11-150693 A    | 6/1999 |
| JP | 2005-71096 A   | 3/2005 |
| JP | 2006-252276 A  | 9/2006 |
| JP | 2007-114402 A  | 5/2007 |
| JP | 2007-223236 A  | 9/2007 |
| JP | 2008-83959 A   | 4/2008 |
| JP | 2008/090902 A1 | 7/2008 |

OTHER PUBLICATIONS

International Search Report, dated Oct. 26, 2010, issued in International Application No. PCT/JP2010/066562.

* cited by examiner

*Primary Examiner* — Michael Lee
(74) *Attorney, Agent, or Firm* — Birch, Stewart, Kolasch & Birch, LLP

(57) ABSTRACT

A display screen includes a video region in contact with a left side section of the display screen for performing a scaling display of an input video; a top region at the uppermost part of the display screen for displaying a plurality of items capable of being selected by a user; and a side region provided to the right or left of the display screen for displaying a plurality of items set at a lower level than an item selected by the user. Among the plurality of items displayed in the side region, an item currently selected by the user is so displayed as to be discriminated from the other items. After the item selected has been discriminatively displayed for a prescribed time period, a guidance describing the item being selected is displayed in the side region close to the item selected.

7 Claims, 9 Drawing Sheets

DISPLAY DEVICE, PROGRAM, AND STORAGE MEDIUM

TECHNICAL FIELD

The present invention relates to a display apparatus, a program, and a computer-readable storage medium containing the program.

BACKGROUND ART

As television receivers (hereinafter also referred to simply as "televisions") are achieving a higher performance and including a larger screen in recent years, televisions are becoming more integrated and higher in functionality. There have been proposed, for example, (i) a television containing a BD/HDD and (ii) a television containing a PC. There have also been proposed a television and a cellular phone that are capable of connecting to a network such as the Internet to receive a CATV broadcast, an IP broadcast, or a one-segment broadcast. There has additionally been proposed a television that (i) includes, for example, a link function such as HDMI in its main body so that an external device can be connected to the television and that (ii) allows a user to view a video from the external device.

Such an integrated, high-functionality television allows a user to, for instance, view a plurality of images from respective sources which images are displayed simultaneously on a display screen of the display apparatus. The above television allows a viewing method that, for instance, causes two videos to be displayed by (i) causing a half of the display screen to perform a scaling display of a video from a tuner in a main body of the television with a relatively large screen and (ii) causing the other half of the display screen to perform a scaling display of an input video from an external device with a relatively small screen.

Most large-screen televisions currently commercially available are display apparatuses that have a display screen with an aspect ratio of 16:9. Broadcast content may, on the other hand, have an aspect ratio of 4:3. Further, a large number of distributed DVDs and the like include content having a set aspect ratio of 4:3. When such content with the aspect ratio of 4:3 is displayed on a display screen having an aspect ratio of 16:9, a user can select a preferred display mode from among various display modes.

Recent years have witnessed a proposal of a super-widescreen television having a display screen with an aspect ratio of 21:9. Such a television will allow a wider variation of display responses.

In addition, there has been widely practiced an on-screen display (hereinafter referred to as "OSD") of information such as an electronic program guide and information on an operation in order to improve convenience and operability of, for example, a television receiver with higher functionality.

Such a viewing form allows a user to view, on a screen of a main body of the television, a display through a plurality of screens (multi-screen) which display includes (i) a broadcast video from a tuner or a network (that is, an IP broadcast or a CATV broadcast), (ii) a playback video by a recording/playback device (that is, a BD, a HDD, or a PC) contained in the main body of the television, and (iii) an output video from an externally connected device. In the case where (i) a single screen simultaneously displays, for example, information items such as an operation menu for the television, an electronic program guide (EPG), and a reservation list and/or a playback list for a BD while displaying both a television video and a BD playback video, and (ii) the screen displays the above information items in a state where they overlap the television video or the BD playback video, a main screen is problematically hidden by an additional display such as the OSD, which decreases the display quality.

In view of the above problem, Patent Literature 1 discloses a display control program that facilitates an operator's confirmation of settings during an operation for improvement of operability. Patent Literature 2 discloses an image forming apparatus that is capable of sufficiently guide an operator through an operation in correspondence with the progress of the operation or content being displayed by a display apparatus.

CITATION LIST

Patent Literature 1

Japanese Patent Application Publication, Tokukai, No. 2007-223236 A (Publication Date: Sep. 6, 2007)

Patent Literature 2

Japanese Patent Application Publication, Tokukai, No. 2008-83959 A (Publication Date: Apr. 10, 2008)

SUMMARY OF INVENTION

Technical Problem

The above conventional techniques, however, problematically fail to allow a user to easily understand the relation between an item being selected and a guidance displayed for the item.

The present invention has been accomplished in view of the above problem. It is an object of the present invention to provide a display apparatus that allows a user to easily understand the relation between an item being selected and a guidance displayed for that item.

Solution to Problem

In order to solve the above problem, a display apparatus of the present invention is a display apparatus capable of performing a scaling display of an input video on a display screen, the display screen including at least: a video region provided in contact with a left side section of the display screen for performing a scaling display of the input video; a top region provided at an uppermost part of the display screen for displaying a plurality of items capable of being selected by a user; a side region provided to on either a left part or a right part of the display screen for at least displaying a plurality of items set at a level lower than a level of an item having been selected by the user in the top region; and a key guidance region provided between the video region and the top region for displaying information describing a key for operating the display apparatus, the display apparatus including: item discriminating display means for displaying an item, being currently selected by the user from among the plurality of items displayed in the side region, in such a manner that the currently selected item is discriminated from another item among the plurality of items displayed in the side region; and guidance display means for, after the item discriminating display means has discriminatively displayed the currently selected item for a prescribed time period, displaying a guidance, describing the currently selected item, in the side region closely to the currently selected item.

The above arrangement (i) allows the user to select one of the plurality of items in the side region, and (ii) after such a selection state has continued for a prescribed time period, displays a guidance, describing the currently selected item, in the side region closely to the currently selected item. The above arrangement, which first displays no guidance in the video region, does not prevent the user from viewing a video. Further, the above arrangement, which displays a guidance closely to a currently selected item, allows the user to easily understand the relation between the two.

As described above, the display apparatus of the present invention allows a user to easily understand the relation between an item being selected by the user and a guidance displayed for that item.

Advantageous Effects of Invention

The display apparatus of the present invention advantageously allows a user to easily understand the relation between an item being selected by the user and a guidance displayed for that item.

DESCRIPTION OF EMBODIMENTS

An embodiment of the present invention described in detail below with reference to FIGS. 1 through 9. It should be noted that although the following description gives various limitations preferred for the present invention to be carried out, the technical scope of the present invention is not to be limited to the embodiment and the description of the drawings below.

Figure 2:
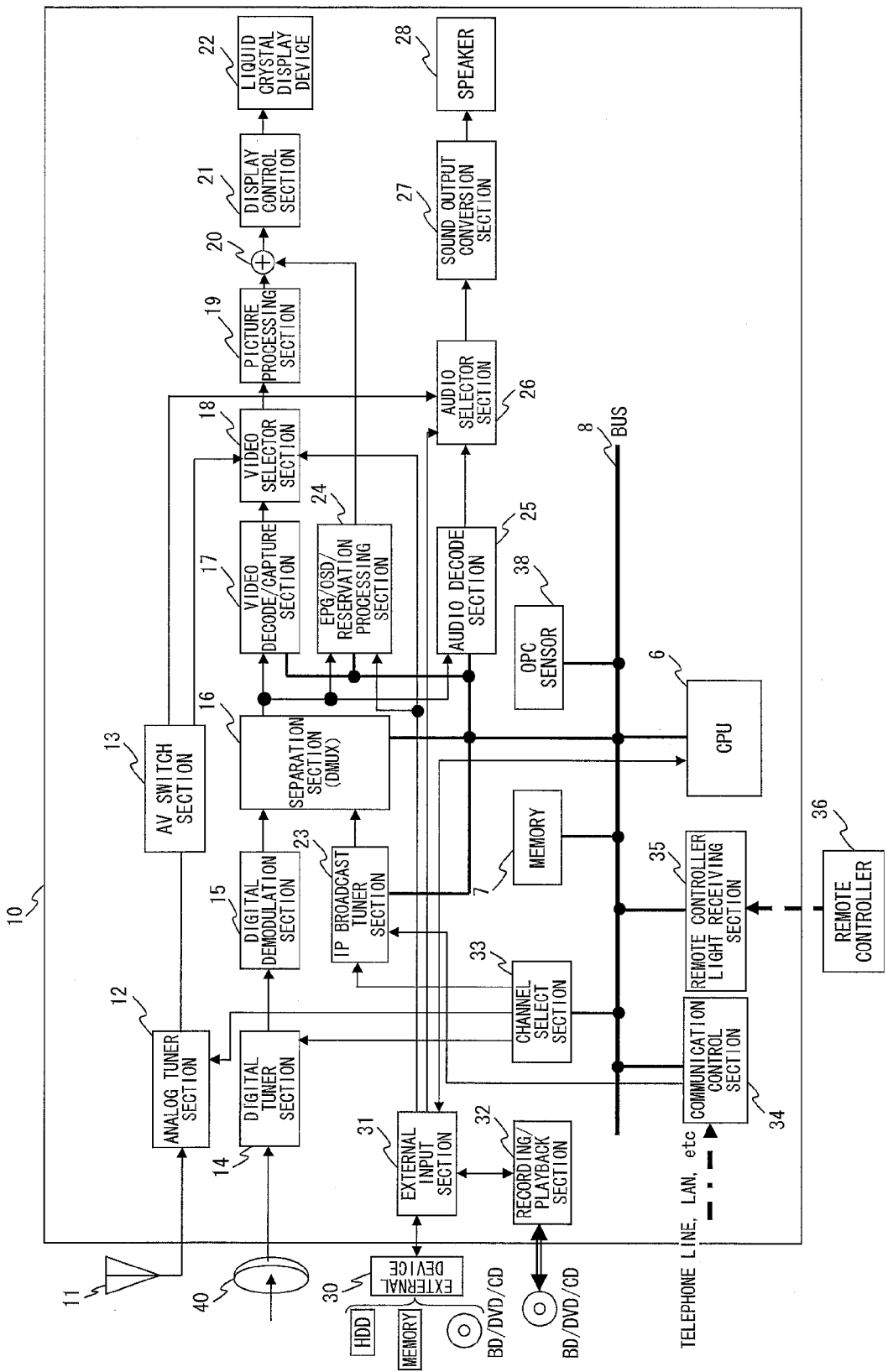
FIG. 2 is a block diagram illustrating a configuration of a television receiver of an embodiment of the present invention.

FIG. 2 is a block diagram illustrating a configuration of a television receiver of an embodiment of the present invention.

In FIG. 2, the reference numeral 10 represents the whole of a television receiver having a liquid crystal display device 22 having a screen size of 16:9 (1920×1010 dots). The liquid crystal display device of the present embodiment is, however, not limited to a liquid crystal display device having a screen size with an aspect ratio of 16:9. The television receiver 10 has a CPU 6 and a memory 7 both connected to a bus 8. The operation of the television receiver 10 is controlled by the CPU 6 and various types of control program stored in the memory 7. That is, the television receiver shown in FIG. 2 is controlled by a computer system including the CPU 6, and a program for causing the television receiver to operate by the computer system is stored in the memory 7.

The memory 7 is normally constituted by a RAM, but may include a ROM in a part thereof. Further, the memory 7 may also include a rewritable flash memory or the like. The memory 7 has stored therein an OS for causing the CPU to operate, various types of control software, etc., and also has stored therein data on program information such as EPG data received through broadcast waves, OSD image data necessary for carrying out an OSD display, etc. Further, the memory 7 has a work region that serves as a work memory necessary for various types of control operation.

The television receiver 10 is provided with an analog tuner section 12, as well as a digital tuner section 14, so as to be able to receive analog broadcasts. Further, the television receiver 10 has an external input section 31 to which any of the following various external devices 30 can be connected: solid memories such as HDDs and SD cards; disk devices such as BD (blu-ray disc) players, DVD players, and CD players; etc. Furthermore, the television receiver 10 has a BD/DVD/CD recording/playback section 32 contained in a main body thereof. Furthermore, the television receiver 10 includes an IP broadcast tuner section 23 so as to be able to receive IP broadcasts.

Besides, the television receiver 10 has an AV switch section 13, a digital demodulation section 15, a separation section (DMUX) 16, a video decode/capture section 17, a video selector section 18, a picture processing section 19, an adding circuit 20, a display control section 21 (item discriminating display means; guidance display means; display means), the liquid crystal display device 22, an EPG/OSD/reservation processing section 24, an audio decode section 25, an audio selector section 26, a sound output conversion section 27, a speaker 28, a channel select section 33, a communication control section 34, and a remote controller light receiving section 35. The television receiver 10 is further provided with an OPC (optical) sensor 38 for detecting ambient brightness.

The analog tuner section 12, which serves to select a channel of analog television broadcast signals that is received through an antenna 11 for analog broadcast reception, selects a channel in accordance with a channel select instruction from the channel select section 33. A received signal from the analog tuner section 12 is separated by the AV switch section 13 into a sound signal and a picture signal. The picture signal is inputted to the video selector section 18, and the sound signal is inputted to the audio selector section 26.

The digital tuner section 14, which serves to select a channel of digital television broadcast signals that is received through an antenna 40 for digital broadcast reception, selects a to-be-received channel in accordance with a channel select instruction from the channel select section 33. A received signal from the digital tuner section 14 is demodulated by the digital demodulation section 15 and sent to the separation section (DMUX) 16.

The IP broadcast tuner section 23, which serves to an IP broadcast channel that is received through the communication control section 34 connected to a telephone line, a LAN, or the like, selects a particular to-be-received IP broadcast channel in accordance with a channel select instruction from the channel select section 33 and sends an output to the separation section (DMUX) 16.

The separation section (DMUX) 16 separates multiplexed picture data and sound data inputted from the digital demodulation section 15 or from the IP broadcast tuner section 23, sends the picture data to the video decode/capture section 17, and sends the sound data to the audio decode section 25. Furthermore, the separation section (DMUX) 16 extracts data such as EPG data contained in a broadcast signal, and sends the data to the EPG/OSD/reservation section 24. It should be noted that the broadcast wave signal extracted by the separation section (DMUX) 16 is recorded in the memory 7, as needed, by the CPU 6 carrying out write control.

The video decode/capture section 17 decodes the picture data separated by the separation section (DMUX) 16 or captures, as a still image, video information contained in the picture data. The picture signal decoded by the video decode/capture section 17 is sent to the video selector section 18. As already mentioned, the video selector section 18 has received a picture signal from the analog tuner section 12, and has also received a picture signal from the external input section 31. In accordance with a control signal from the CPU 6, the video selector section 18 selects and outputs one of these input picture signals, and set the picture signal to the picture processing section 19.

The picture processing section 19 performs picture processing such as noise reduction, sharpness adjustment, and contrast adjustment on the picture signal inputted thereto, thereby converting the picture data into an optimum picture signal for the liquid crystal display device 22.

The display control section 21 is a part including a driving circuit for causing the liquid crystal display device 22 to display received picture data, and sends, to the liquid crystal display device 22, picture data obtained by the adders 20 adding, to the picture data sent from the picture processing section 19, electronic program guide (EPG) data or OSD (on-screen display) data sent from the EPG/OSD/reservation section 24. The liquid crystal display device 22 displays the incoming picture data on the screen.

The EPG/OSD/reservation section 24 further performs processing for a scaling display in accordance with the present invention. This is described later in detail.

The audio decode section 25 serves to decode the sound data sent from the separation section (DMUX) 16. The audio decode section 25 sends the sound signal thus decoded to the audio selector section 26.

The audio selector section 26 receives the sound signal from the AV switch section 13, a sound signal from the external input section 31, and the sound signal from the audio decode section 25, selects a sound signal corresponding to the picture signal selected by the video selector section 18 under control of the CPU 6, and sends the sound signal to the speaker 28 through the audio output conversion section 27. The audio output conversion section 27 converts the sound signal thus received into an optimum signal for playback in the speaker 28 and supplies the signal to the speaker 28.

The remote controller light receiving section 35 serves to receive an optical signal from a remote controller 36 and accept a control signal from the remote controller 36. As will be described later, a transition to a scaling display, the selection, determination, etc. of various buttons during a scaling display, and instructions from the user are made through the remote controller 36.

The EPG/OSD/reservation section 24 creates an electronic program guide in accordance with regularly updated and saved EPG data, and draws OSD data saved in advance in the memory 7. The OSD data is data for drawing various types of information stored in advance in the memory 7, such as a setting menu screen, a volume gauge, current time, and a channel selected. Further, the EPG/OSD/reservation section 24 performs processing such as making a reservation for a program by using the electronic program guide.

Figure 4:
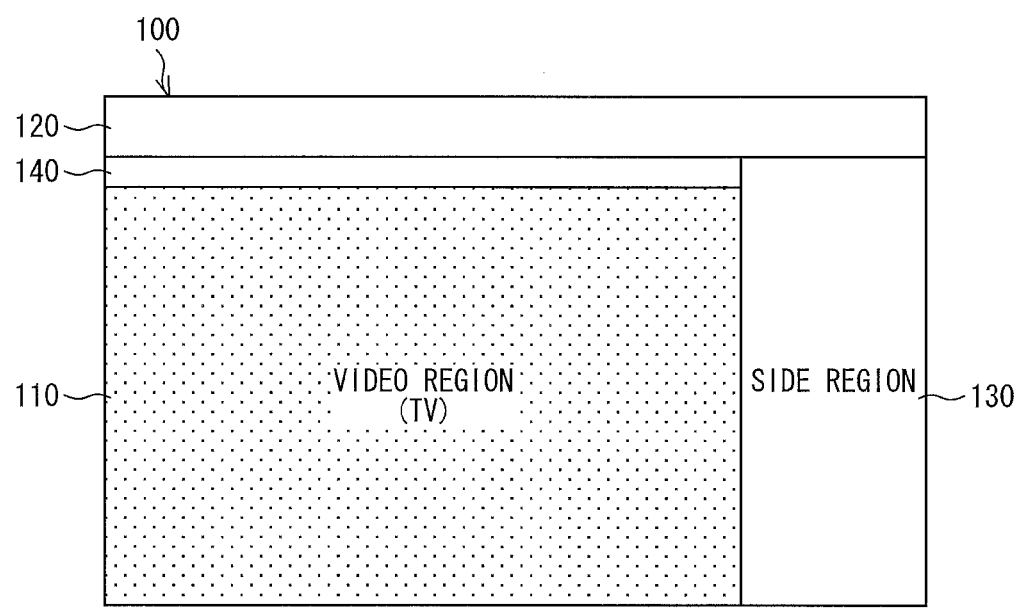
FIG. 4 is a diagram illustrating a configuration of a display screen included in a display apparatus of the present invention.

The EPG/OSD/reservation processing section 24 further cooperates with the CPU 6 to perform a scaling display illustrated in FIG. 4. Specifically, the EPG/OSD/reservation processing section, when performing a scaling display, (i) performs a scaling display of an input video in a video region 110, and further (ii) reads, from the memory 7, data to be displayed in a top region 120, a side region 130, and a key guidance region 140 in order to draw the data on a display screen 100 of the display apparatus. In addition, the EPG/OSD/reservation processing section (i) performs a function assigned to any of various "buttons" which has been selected through an input on the remote controller 36, and (ii) performs a display based on a result of performing the function.

The communication control section 34 carries out control so that communication is established through a network such as a telephone line, a LAN, or the Internet.

The foregoing description has been given by taking a television receiver as a particular example. However, it is apparent that the display method in accordance with the invention of the present application can also be applied in the case of television reception by a portable device that allows television viewing, e.g., by a cellular phone, a car navigation system, a portable game terminal, etc.

Figure 3:
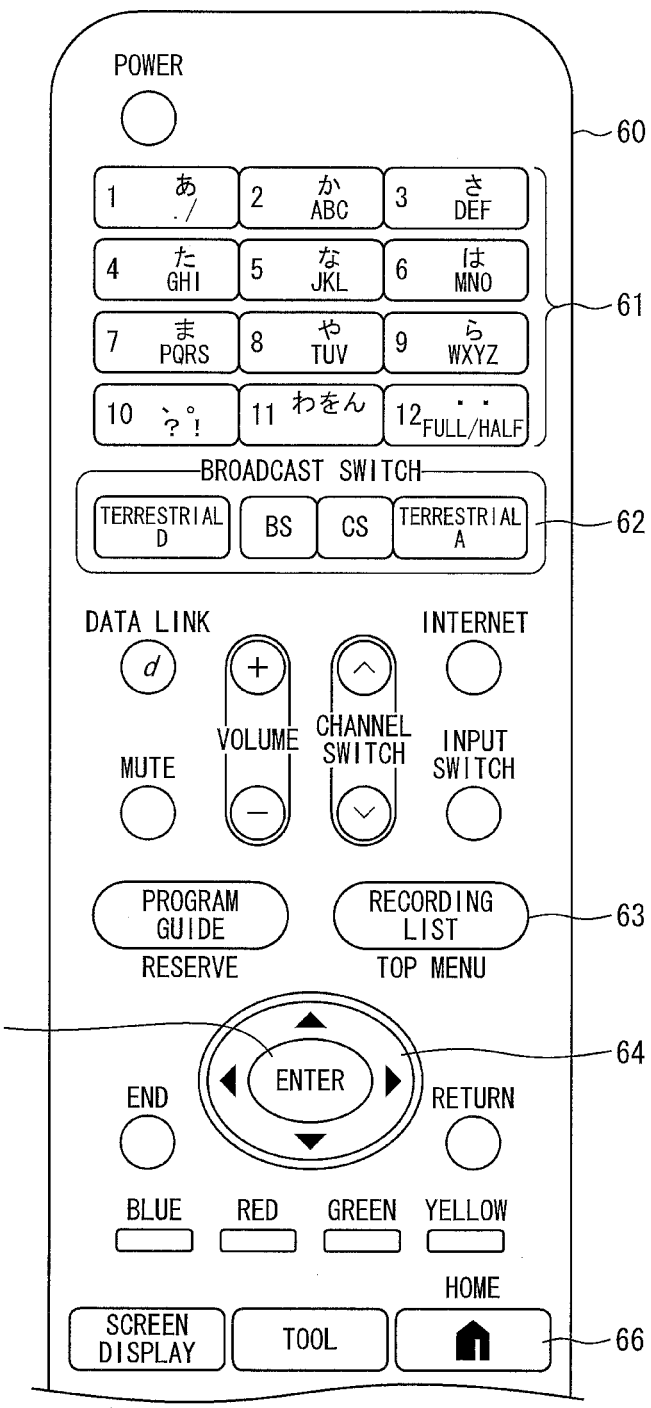
FIG. 3 is a diagram illustrating a specific example of a remote controller shown in FIG. 2.

FIG. 3 is a diagram illustrating a specific example of the remote controller 36 shown in FIG. 2. The remote controller 36 includes: a main body section 60; and various key groups provided on a surface of the main body section 60. Since such a remote controller itself is already well known, the description below does not deal with all the keys in detail. The remote controller includes, for example: a key group 61 for channel selection; a key group 62 for use in switching broadcasts; a key 63 for displaying a video recording list; a cross key 64 for selecting among "buttons" set on the display screen 100; an enter key 65 for determining on a "button"; and a home key 66 for setting a display to a particular display state. The remote controller illustrated in FIG. 3 allows a user to input, for example, a hiragana character with use of the key group 61.

When the television receiver 10 shown in FIG. 2 is receiving a television broadcast or such a television broadcast is being viewed with use of the television receiver, the user can anytime switch the display mode to a scaling display mode illustrated in FIG. 4, and thus cause an input video to be displayed in the scaling display mode. The user can switch display modes as above by operating the remote controller 36. Allotting to, for example, the home key 66 the function of switching to the scaling display mode allows the user to simply press the home key 66 in order to switch the display screen to the scaling display mode at any timing. The above remote controller and operation on the remote controller are merely an example, and may, needless to say, be modified variously.

FIG. 4 is a diagram illustrating a configuration of the display screen 100 included in the display apparatus of the present invention. In FIG. 4, the reference numeral 100 represents the display screen included in the display apparatus of the present invention. The display screen 100 includes a video region 110 for displaying an input video from, for example, a television tuner; a top region 120 located at the uppermost part of the display screen 100; a side region 130 located to the right of the video region 110; and a key guidance region 140 located between the top region 120 and the video region 110.

The video region 110 is a region for displaying an input video while maintaining the aspect ratio of the input video. Specifically, in the case where, for example, the input video is a received video of a Japanese high-definition television broadcast having an aspect ratio of 16:9, the video region 110 is set to have the aspect ratio of 16:9. This arrangement makes it possible to perform a scaling display of an input video in the video region 110 without changing the aspect ratio of the input video. In the case where the display screen 100 has the aspect ratio of 16:9, the video region 110 is similar in shape to the display screen 100.

In the above case, the input video is displayed throughout the entire display screen 100 in a normal display state in which no scaling display is performed. The user's operation of a particular button on the remote controller, for instance, allows a transition to the display mode (scaling display mode) in which a scaling display is performed as illustrated in FIG. 4. This is described later in detail.

The display screen 100 is not limited to a display screen having the aspect ratio of 16:9, and may, for example, be a super-wide display screen having an aspect ratio of 21:9.

The top region 120 extends from a left side section to a right side section of the display screen 100. The side region 130 is in contact with the lower side of the top region 120, and extends therefrom in a downward direction. Positioning the top region 120 so that it is shown over an upper part of the side region 130 allows the user to visually and intuitively understand that the top region 120 is upper in class than the side region 130. In the case where, with use of the above characteristic, (i) information that is upper in class is displayed in the top region 120 and (ii) information that is lower in class is displayed the side region 130, it is possible to create a user-friendly interface that allows an intuitive operation.

The top region 120, the side region 130, and the key guidance region 140 are each a region for displaying useful information other than an input video, and are each also used as a region for displaying a plurality of "buttons" each for performing a particular function. The user can select such a region, in which the "buttons" are displayed, with use of, for example, a particular key on the remote controller. Selecting and pressing, for example, the "ENTER" key on the remote controller allows performance of the particular function assigned to the selected "button".

FIG. 4 illustrates the video region 110 as being in contact with the left side section of the display screen 100. The video region, however, does not need to be in contact with the left side section in a strict sense. In short, the video region, needless to say, simply needs to be visually recognized by the user as being in contact with the left side section. The present specification thus uses terms such as "in contact" in such a sense.

The present embodiment involves, for the display screen 100, (i) setting an approximately size of the video region 110 and (ii) choosing how to set the respective dimensions of the top region 120 and the key guidance region 140 along the longitudinal direction of the screen. These two points are determined in consideration of the following three points: ease of view of a video displayed in the video region 110; ease of view of information displayed in the top region 120, the side region 130, and the key guidance region 140; and ease of view of the whole of the display screen 100.

Figure 5:
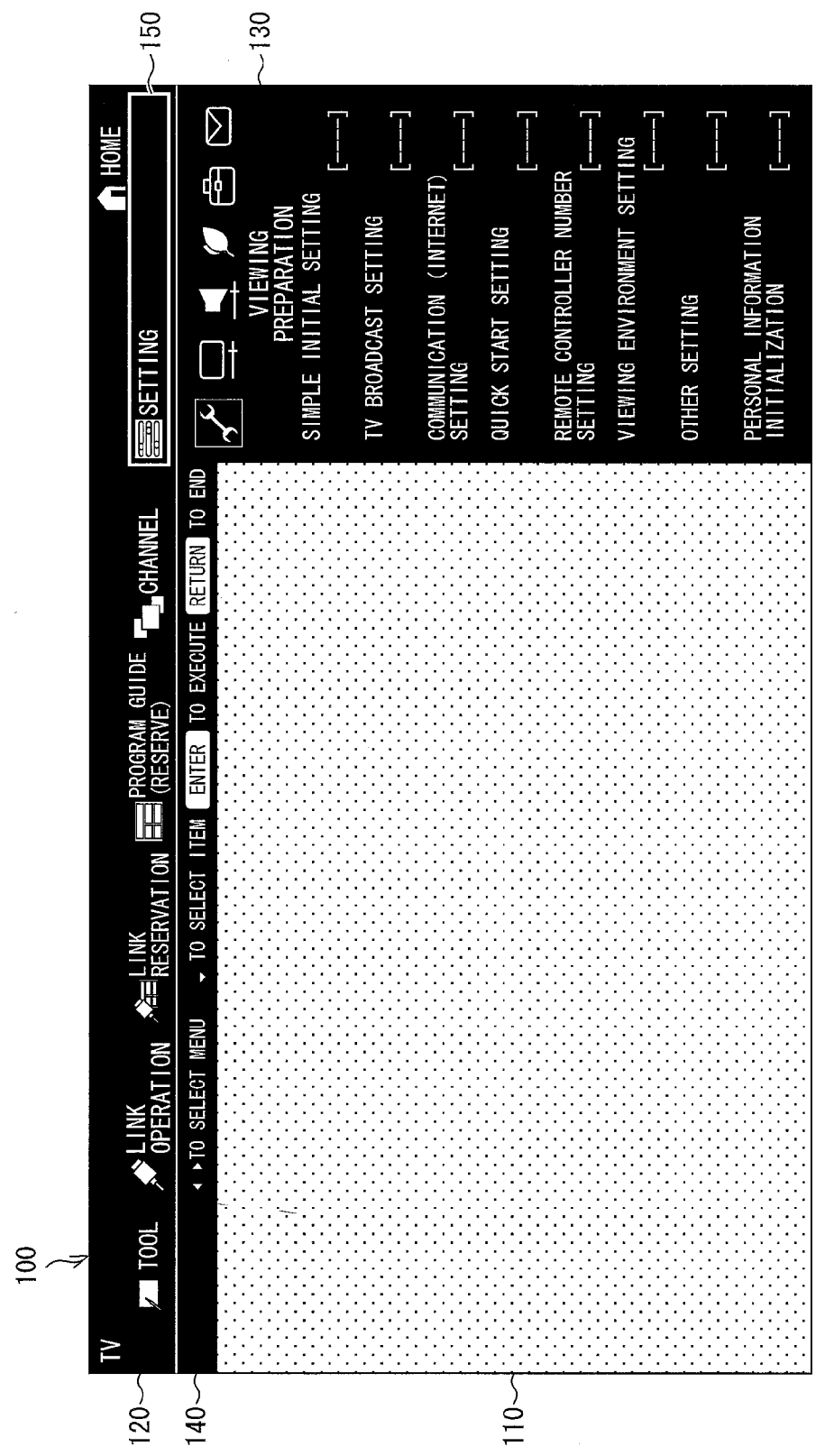
FIG. 5 is a diagram illustrating details of a display screen in a state in which it is performing a scaling displayed of an input video.

When the user presses a predetermined button (for example, the home key 66) on the remote controller 36, the screen of the liquid crystal display device 22 transits from (i) a state in which an input video is displayed throughout the entire screen to (ii) the display state of the display screen 100 illustrated in FIG. 5. FIG. 5 is a diagram illustrating details of the display screen 100 in a state in which it is performing a scaling displayed of an input video. The top region 120, as illustrated in FIG. 5, displays a plurality of items from which the user can select. The individual items each include a button and its name. These items are included in a first class of a menu for displaying functions that the television receiver 10 is capable of perform. The user operates the remote controller 36 to select one of the items displayed in the top region 120. The display screen displays a currently selected item in such a manner that the item is discriminated from the other items. The example of FIG. 5 displays a focus 150 for the currently selected item simultaneously with that item. This arrangement allows the user to easily understand which item is being selected.

The upper part of the side region 130 displays a plurality of items set at a lower level than an item being selected in the top region 120. Those items are included in a first sub-class of the menu.

The remaining part of the side region 130 displays a plurality of items set at a lower level than an item being selected from among the selection items included in the first sub-class. Those items are included in a second class of the menu.

The key guidance region 140 displays information (referred to as "key guidance") indicating, for each button, what processing can be performed by a press of which button among some of the buttons provided to the remote controller 36. More specifically, the present embodiment displays, as key guidance, information for guiding a key entry for selection of an item displayed in the top region 120 and the side region 130.

Figure 6:
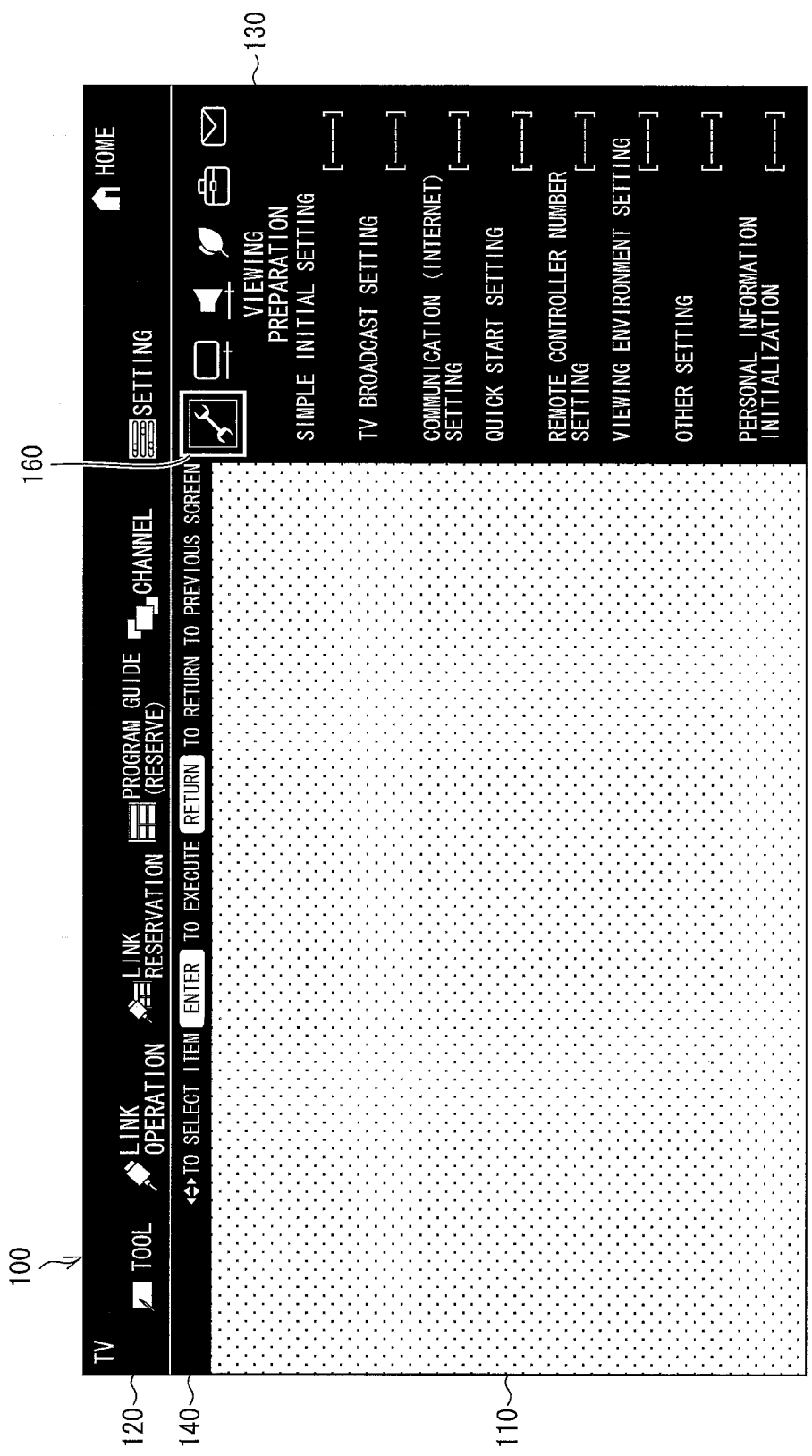
FIG. 6 is a diagram illustrating a display screen in a state in which it displays a focus for an item being selected among a plurality of items displayed in the upper part of the side region.

The user operates the remote controller 36 to select one of the items displayed in the upper part of the side region 130. During this operation, the display screen displays a currently selected item in such a manner that the item is discriminated from the other items. The example of FIG. 6 displays a focus 160 for the currently selected item simultaneously with that item. FIG. 6 is a diagram illustrating the display screen 100 in a state in which it displays a focus 160 for an item being selected from among a plurality items displayed in the upper part of the side region 130. As illustrated in FIG. 6, the display screen displays the focus 160 simultaneously with the item being selected (FIG. 6). This arrangement allows the user to easily understand which one of the items in the first sub-class is being selected. While the focus is displayed as above, the key guidance region 140 continues to display the key guidance.

Figure 1:
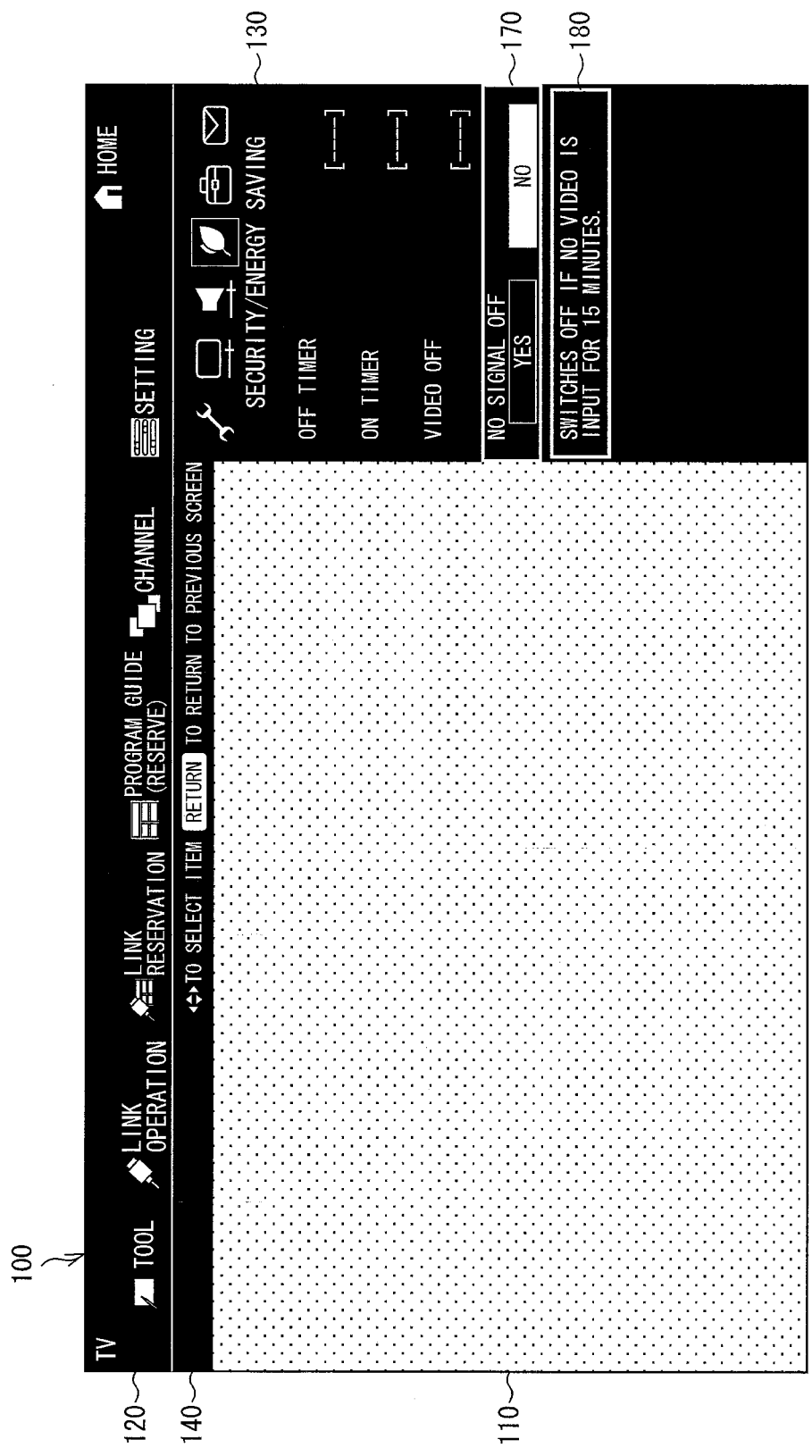
FIG. 1 is a diagram illustrating a display screen in a state in which it displays (i) a focus for an item being selected among a plurality of items in a second class that are displayed in a side region and (ii) a guidance on the item being selected.

While the display screen 100 of FIG. 6 is displayed, the user operates the remote controller 36 to select one of the items in the second class that are displayed in the side region 130. During this operation, the display screen displays a currently selected item in such a manner that the item is discriminated from the other items. The example of FIG. 1 displays a focus 170 for the currently selected item simultaneously with that item. FIG. 1 is a diagram illustrating the display screen 100 in a state in which it displays (i) a focus 170 for a currently selected item among the items in the second class that are displayed in the side region 130 and (ii) a guidance on the currently selected item. As illustrated in FIG. 1, the display screen displays a currently selected item simultaneously with a focus 170. This arrangement allows the user to easily understand which one of the items in the second class is being selected. While the focus is displayed, the key guidance region 140 continues to display the key guidance.

Figure 7:
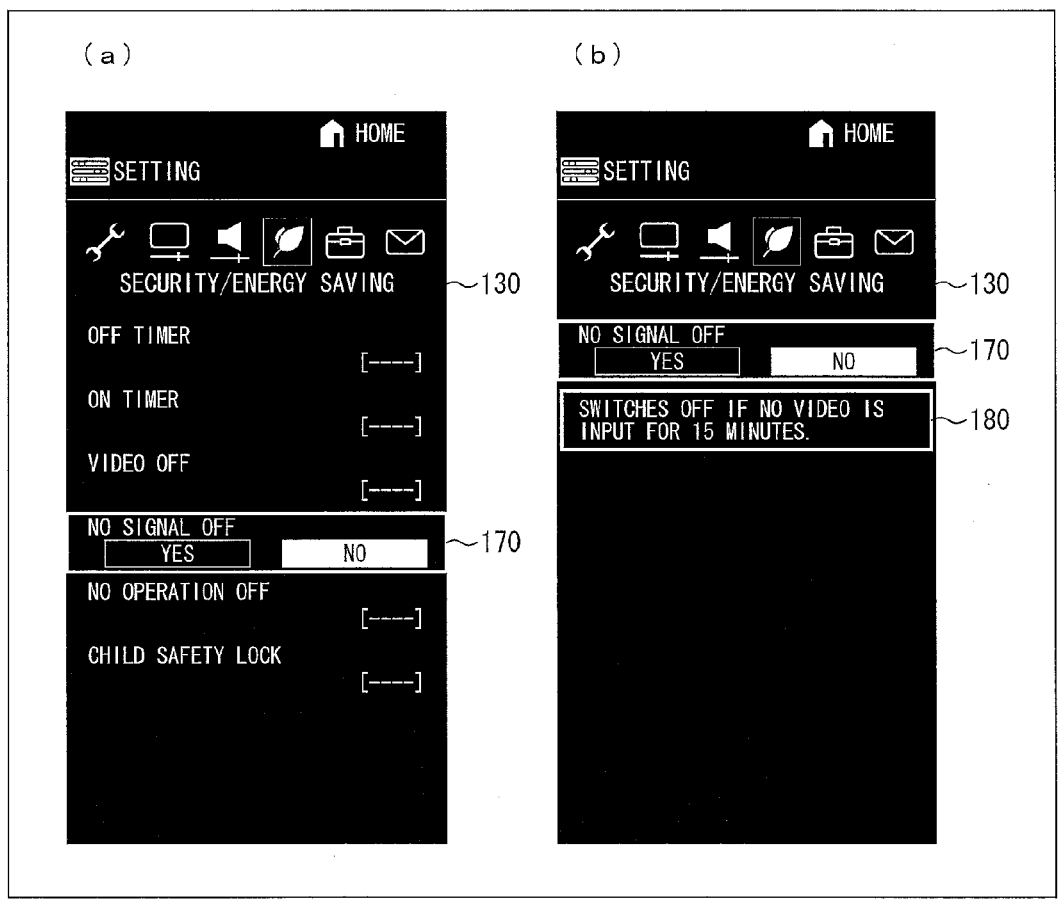
FIG. 7 shows diagrams each illustrating a display screen, where (a) is a diagram illustrating the display screen in a state in which it displays a focus for an item being selected in the side region, and (b) illustrates the display screen in a state in which it displays an item being selected and a guidance at respective fixed positions in the side region.

The example illustrated in FIG. 1 (i) displays a focus 170 for the item being selected by the user, and (ii) if such a display has continued for a prescribed time period (in the present embodiment, three seconds), displays a guidance 180 on the currently selected item directly below it. This guidance 180 provides the user with information on settings to be reflected in the television receiver 10 in the case where selection of an item (in FIG. 7, the item "NO SIGNAL OFF") for which the focus 170 is displayed has been determined on. Since an item being selected and the guidance on it are so displayed simultaneously as to be close to each other as illustrated in FIG. 7, the user can quite easily understand the relation between the two. The guidance 180 may alternatively be displayed, not below, but above an item for which the focus 170 is displayed. Regardless of the position, the two are displayed closely to each other.

As illustrated in FIG. 1, while the guidance 180 is displayed, the key guidance region 140 continues to display the key guidance. In other words, since the guidance 180 in FIG. 7 is not displayed in the key guidance region 140, the key guidance is not erased from the display screen 100. This arrangement allows the user to constantly refer to a display on the display screen 100 to learn how to operate the remote controller 36 for selection of an item displayed on the display screen 100.

The guidance 180 may also be displayed in accordance with the procedure illustrated in FIG. 7. (a) of FIG. 7 is a diagram illustrating the display screen 100 in a state in which it displays a focus 170 for an item being selected in the side region 130. (b) of FIG. 7 is a diagram illustrating the display screen 100 in a state in which it displays such a currently selected item and a guidance 180 on it at respective fixed positions in the side region 130.

(a) of FIG. 7 illustrates a focus 170 displayed for an item being selected by the user. At this moment, the side region does not display a guidance 180 because a prescribed time period has not elapsed since the start of a display of the focus 170. When the prescribed time period has elapsed since the start of a display of the focus 170, the display position of the item for which the focus 170 is displayed moves to a fixed position different from the original position as illustrated in (b) of FIG. 7. The present embodiment moves such a currently selected item to the position at which to display the uppermost item (that is, the first item) among the items in the second class that are displayed in the side region 130 longitudinally. The side region then displays (i) at the fixed position, the item being selected by the user, (ii) a focus 170 around that item, and (iii) a guidance 180 below that item. The side region stops displaying all the items other than the item being selected. The side region shows an animation of the move of the currently selected item from the original position (that is, the position in (a) of FIG. 7) to a destination position (that is, the position in (b) of FIG. 7).

The example of FIG. 7, no matter which item is selected from among the items in the second class, causes (i) the item for which the focus 170 is displayed and (ii) a guidance 180 on that item to be displayed at the respective fixed positions. This arrangement allows the user to simply look at the same position on the display screen 100 to quickly find an item being selected and a guidance 180 on it.

Figure 8:
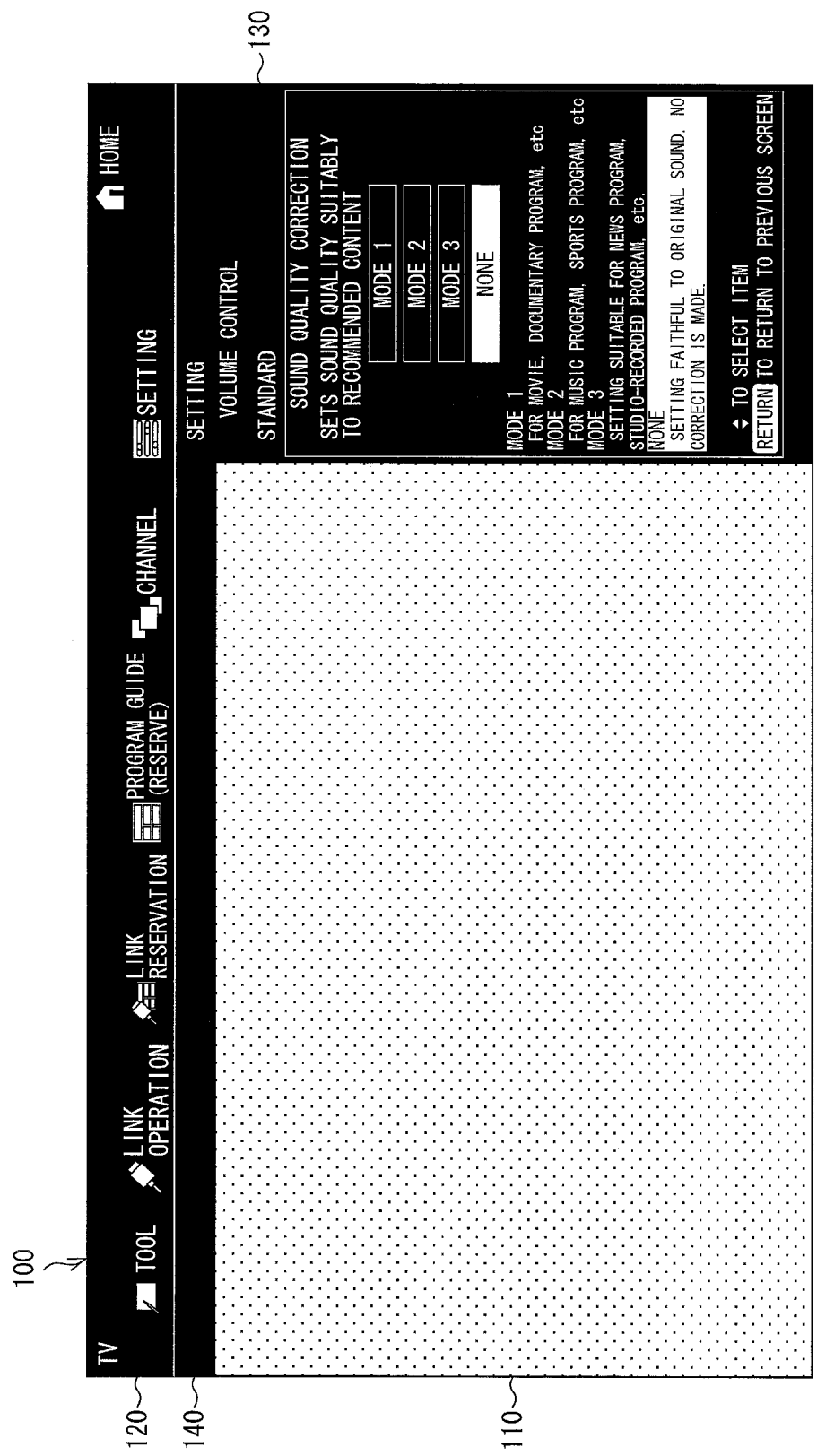
FIG. 8 is a diagram illustrating a display screen in a state in which it displays a plurality of items in a second class as a result of determination on selection of an item in the side region.

When the user has determined on selection of one of the items displayed in the side region 130, the side region 130 may, depending on the type of the item, display a plurality of items set at a lower level than the selected item. The following describes such an example with reference to FIG. 8. FIG. 8 is a diagram illustrating the display screen 100 in a state in which it displays a plurality of items in the second class as a result of the above determination on selection of an item in the side region 130.

The display screen 100 in FIG. 8, as a result of the user's determination on selection of one of the items displayed in the side region 130, displays in the side region 130 a plurality of items (lower-level items) set at a lower level (that is, a third class) than the selected item. The side region 130 displays, (i) in the order below and (ii) directly below the position at which to display the items in the first sub-class: the selected item in the second class; a guidance on that item; a plurality of items (lower-level items; button items) at a lower level (that is, the third class) than the selected item; all guidances (button guidances; lower-level guidances) for the respective items in the third class; and a key guidance. A button guidance provides the user with information on settings to be reflected in the television receiver 10 in the case where the user has determined on selection of the button item corresponding to the button guidance.

The user can operate the remote controller 36 to select one of the button items. The side region displays a currently selected button item in such a manner that it is discriminated from the other button items (by, for example, additional display of a focus and/or a color change). The side region displays, among the button guidances, the button guidance for a currently discriminatively displayed button item so that the button guidance is discriminated from the other button guidances. The side region, for instance, changes at least one of text color, text size, text thickness, and text type of a discriminatively displayed button guidance so that the at least one is different from that of any other button guidance. The side region alternatively (i) underlines or decorates a discriminatively displayed button guidance, (ii) blinks the text of the button guidance, or (iii) displays an animation for the button guidance. Any of these measures allows the user to understand at a glance which button item is being selected.

The example of FIG. 8 displays a key guidance, not in the key guidance region 140, but below the button guidance in the side region 130. This arrangement differs from a conventional technique of displaying a key guidance, not in a side region 130, but at the lowermost part of a screen, and thus achieves the advantage of (i) preventing a key guidance from blocking the user's viewing of a video and (ii) reducing move of the user's visual point during the operation.

Figure 9:
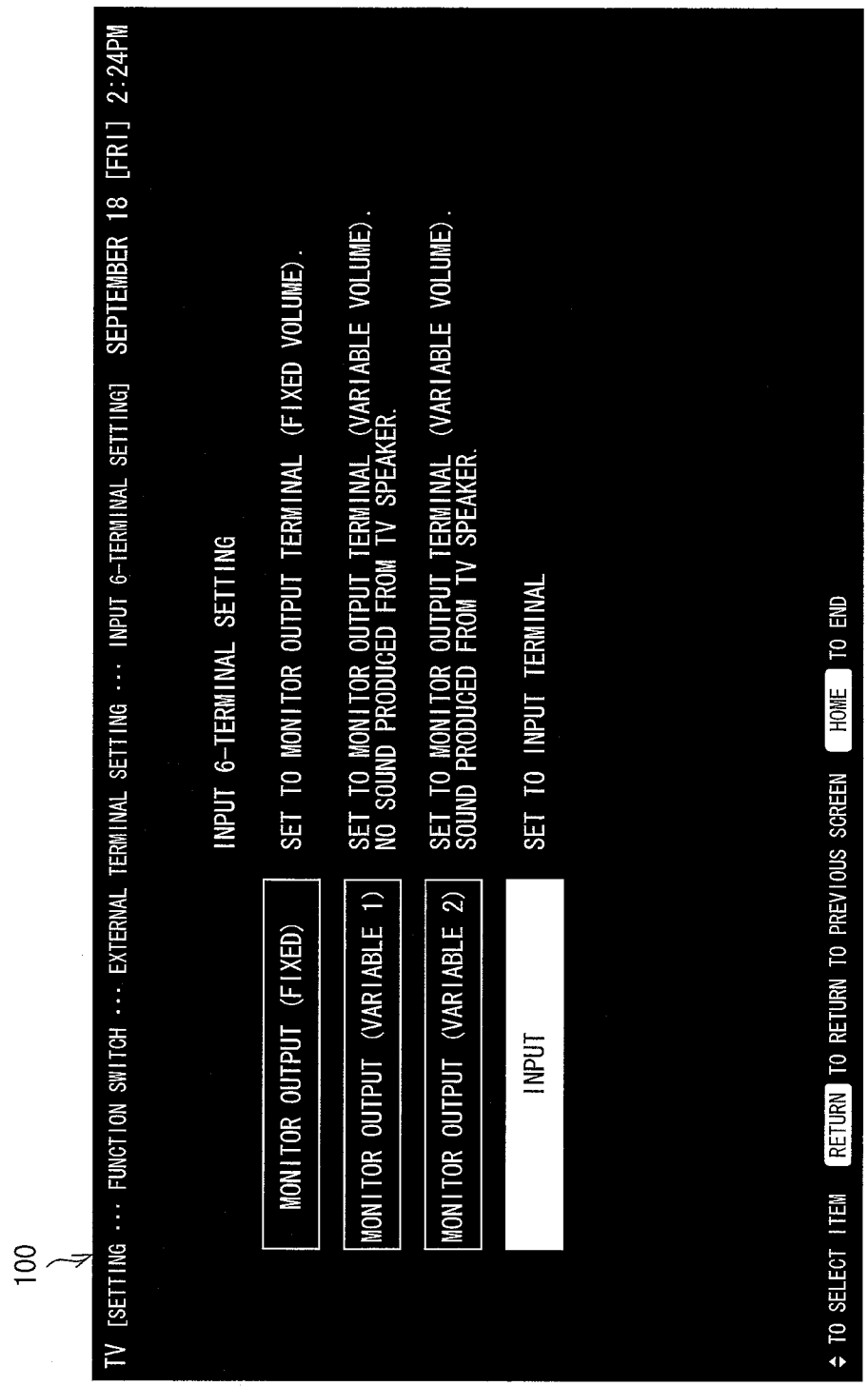
FIG. 9 is a diagram illustrating a display screen in a state in which it displays a guidance, a plurality of button items, and a plurality of button guidances over the entire screen.

The side region 130, in the case where, for instance, (i) there are a large number of button items or (ii) a button guidance contains a large amount of text, may not be able to display those button items or text simultaneously. In such a case, the present embodiment displays a guidance, a plurality of button items, and a plurality of button guidances over the entire screen as illustrated in FIG. 9. FIG. 9 is a diagram illustrating the display screen 100 in a state in which it displays a guidance, a plurality of button items, and a plurality of button guidances over the entire screen.

The example of FIG. 9 displays, over the entire screen, (i) the guidance on the item in the second class of which item the selection has been determined on by the user, (ii) a plurality of button items at a lower level than the selected item, and (iii) a plurality of button guidances each individually describing one of the button items. More specifically, the above example displays (i) a guidance at an upper part around the center of the screen, (ii) a plurality of button items arranged longitudinally below the guidance, and (iii) respective button guidances for the button items next to the button items. The above example displays a currently selected button item in such a manner that the item is discriminated from the other button items.

The above arrangement, even in the case where the side region 130 is unable to sufficiently display information as above, displays the information over the entire screen and thus advantageously allows reliable presentation, to the user, of necessary information to be presented to the user.

The present invention is not limited to the description of the embodiments above, but may be altered by a skilled person in many ways within the scope of the claims. That is, a new embodiment is obtained by combining properly altered technical means within the scope of the claims.

For instance, the side region 130 may alternatively be located, not to the right, but to the left of the display screen 100.

Further, the present embodiment may alternatively include button items in the second class and respective button guidances describing the button items. In this case, the present embodiment, after a prescribed time period has elapsed since the start of a discriminative display of a button item being selected by the user, displays the button guidance on the currently selected button item among the button items in the second class in such a manner that the button guidance is close to the button item.

(Program and a Storage Medium)

Finally, the components of the television receiver 10 may be realized by way of hardware or software as executed by a CPU (central processing unit) as follows:

The television receiver 10 includes a CPU and storage devices (recording media). The CPU executes instructions in programs realizing the functions. The memory devices include a ROM (read only memory) which contains the programs, a RAM (random access memory) to which the programs are loaded in an executable form, and a memory containing the programs and various data. This configuration allows the objective of the present invention to be achieved by a predetermined storage medium.

The storage medium needs only computer-readably contain a program code (executable program, intermediate code program, or source program) for the television receiver 10, which is software realizing the aforementioned functions. The storage medium is mounted to the television receiver 10, so that the television receiver 10 (or CPU, MPU) in the form of a computer retrieves and executes the program code contained in the storage medium thus mounted.

The recording medium, which supplies the program code to the television receiver 10, is not limited to a particular structure or type. The recording medium may be, for example, a tape, such as a magnetic tape or a cassette tape; a magnetic disk, such as a floppy (registered trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The objective of the present invention can also be achieved by configuring the television receiver 10 to be connectable to a communication network. In this case, the program code is supplied to the television receiver 10 over the communication network. The communication network needs only be a communication network over which the program code can be supplied to the television receiver 10, and is not limited to a particular type or form. Examples of the communication network include the Internet, an intranet, an extranet, a LAN, ISDN, a VAN, a CATV communication network, a virtual private network, a telephone line network, a mobile communication network, a satellite communication network, etc.

A transmission medium constituting the communication network also needs only be any medium through which the program code can be transmitted, and is not limited to a particular configuration or type. Examples of the transmission medium include a cable system such as IEEE 1394, a USB, a power line, a cable TV line, a telephone line, an ADSL (Asymmetric Digital Subscriber Line) line, etc. Alternatively, it is possible to use, as the transmission medium, a wireless system such as infrared rays as in IrDA and a remote controller, Bluetooth (registered trademark), 802.11 wireless, HDR, a cellular-phone network, a satellite line, a terrestrial digital network, etc. It should be noted that the present invention can be achieved in the form of a computer data signal realized by electronic transmission of the program code and embedded in a carrier wave.

(Summary of the Present Invention)

As described above, a display apparatus of the present invention is a display apparatus capable of performing a scaling display of an input video on a display screen, the display screen including at least: a video region provided in contact with a left side section of the display screen for performing a scaling display of the input video; a top region provided at an uppermost part of the display screen for displaying a plurality of items capable of being selected by a user; a side region provided to on either a left part or a right part of the display screen for at least displaying a plurality of items set at a level lower than a level of an item having been selected by the user in the top region; and a key guidance region provided between the video region and the top region for displaying information describing a key for operating the display apparatus, the display apparatus including: item discriminating display means for displaying an item, being currently selected by the user from among the plurality of items displayed in the side region, in such a manner that the currently selected item is discriminated from another item among the plurality of items displayed in the side region; and guidance display means for, after the item discriminating display means has discriminatively displayed the currently selected item for a prescribed time period, displaying a guidance, describing the currently selected item, in the side region closely to the currently selected item.

The display apparatus of the present invention may preferably be arranged such that the item discriminating display means (i) erases, among the plurality of items displayed in the side region, each item other than the item being currently selected by the user and (ii) displays the currently selected item at a fixed position in the side region.

The above arrangement causes (i) an item being selected by the user and (ii) a guidance on that item to be displayed at respective fixed positions in the side region regardless of the type of the item being selected. This arrangement allows the user to simply look at the same position on the display screen to quickly find an item being selected and a guidance on it.

The display apparatus of the present invention may preferably further include: display means for displaying, in a downward sequence from above in the side region, (i) the guidance on, among the plurality of items displayed in the side region, an item of which selection has been determined on by the user, (ii) a plurality of lower-level items set at a level lower than a level of the item of which the selection has been determined on, and (iii) a plurality of lower-level guidances each individually describing one of the plurality of lower-level items.

The above arrangement simultaneously displays, in the side region, a plurality of lower-level guidances each describing one of the plurality of lower-level items. The above arrangement thus saves the user the trouble of needing to select a desired lower-level item to read the guidance on the lower-level item.

The display apparatus of the present invention may preferably be arranged such that the display means displays the key guidance at a position in the side region which position is below the plurality of lower-level guidances.

The above arrangement displays a key guidance at the lowermost part of the side region. This arrangement differs from a conventional technique of displaying a key guidance, not in a side region, but at the lowermost part of a screen, and thus achieves the advantage of (i) preventing a key guidance from blocking the user's viewing of a video and (ii) reducing move of the user's visual point during the operation.

The display apparatus of the present invention may preferably be arranged such that the display means displays (i) a lower-level item, being currently selected by the user, among the plurality of lower-level items in such a manner that the currently selected lower-level item is discriminated from any other lower-level item, and (ii) a first guidance, describing the currently selected lower-level item, in such a manner that the first guidance is discriminated from any other guidance.

The above arrangement allows the user to understand at a glance which guidance describes a lower-level item being selected.

The display apparatus of the present invention may preferably be arranged such that the display apparatus displays, entirely over the display screen, (i) the guidance on, among the plurality of items displayed in the side region, an item of which selection has been determined on by the user, (ii) a plurality of lower-level items set at a level lower than a level of the item of which the selection has been determined on, (iii) a plurality of lower-level guidances each individually describing one of the plurality of lower-level items, and (iv) the key guidance.

The above arrangement, even in the case where there are so many lower-level items or so many characters in a lower-level guidance that the side region is unable to display them, can display all of such many lower-level items or characters by displaying them over the entire screen.

The display apparatus may be in the form of a computer. In this case, the present invention encompasses in scope (i) a program causing a computer to function as each of the means to form the display apparatus with a computer and (ii) a computer-readable storage medium containing the program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is most suitably applicable to a display apparatus such as a television receiver.

REFERENCE SIGNS LIST

100 Display screen
110 Video region
120 Top region
130 Side region
140 Key guidance region
150 Focus
160 Focus
170 Focus
180 Guidance

The invention claimed is:

1. A display apparatus capable of performing a scaling display of an input video on a display screen,
the display screen including at least:
a video region provided in contact with a left side section of the display screen for performing a scaling display of the input video;
a top region provided at an uppermost part of the display screen for displaying a plurality of items capable of being selected by a user;
a side region provided to on either a right side or a left side of the display screen for at least displaying a plurality of items set at a level lower than a level of an item having been selected by the user in the top region; and
a key guidance region provided between the video region and the top region for displaying information describing a key for operating the display apparatus,
the display apparatus comprising:
item discriminating display means for displaying an item, being currently selected by the user from among the plurality of items displayed in the side region, in such a manner that the currently selected item is discriminated from another item among the plurality of items displayed in the side region; and
guidance display means for, after the item discriminating display means has discriminatively displayed the currently selected item for a prescribed time period, displaying a guidance, describing the currently selected item, in the side region closely to the currently selected item.

2. The display apparatus as set forth in claim 1, wherein:
the item discriminating display means (i) erases, among the plurality of items displayed in the side region, each item other than the item being currently selected by the user and (ii) displays the currently selected item at a fixed position in the side region.

3. The display apparatus as set forth in claim 1, further comprising:
display means for displaying, in a downward sequence from above in the side region, (i) the guidance on, among the plurality of items displayed in the side region, an item of which selection has been determined on by the user, (ii) a plurality of lower-level items set at a level lower than a level of the item of which the selection has been determined on, and (iii) a plurality of lower-level guidances each individually describing one of the plurality of lower-level items.

4. The display apparatus as set forth in claim 3, wherein:
the display means displays the key guidance at a position in the side region which position is below the plurality of lower-level guidances.

5. The display apparatus as set forth in claim 3, wherein:
the display means displays (i) a lower-level item, being currently selected by the user, among the plurality of lower-level items in such a manner that the currently selected lower-level item is discriminated from any other lower-level item, and (ii) a first guidance, describing the currently selected lower-level item, in such a manner that the first guidance is discriminated from any other guidance.

6. The display apparatus as set forth in claim 1, wherein:
the display apparatus displays, entirely over the display screen, (i) the guidance on, among the plurality of items displayed in the side region, an item of which selection has been determined on by the user, (ii) a plurality of lower-level items set at a level lower than a level of the item of which the selection has been determined on, (iii) a plurality of lower-level guidances each individually describing one of the plurality of lower-level items, and (iv) the key guidance.

7. A non-transitory computer-readable storage medium containing a program, which when executed by a computer performs a scaling display of an input video on a display screen, the display screen including at least:
- a video region provided in contact with a left side section of the display screen for performing the scaling display of the input video;
- a top region provided at an uppermost part of the display screen for displaying a plurality of items capable of being selected by a user;
- a side region provided to on either a right side or a left side of the display screen for at least displaying a plurality of items set at a level lower than a level of an item having been selected by the user in the top region; and
- a key guidance region provided between the video region and the top region for displaying information describing a key for operating the display apparatus.

the computer further performs;

displaying an item discriminating display means, the item being currently selected by the user from among the plurality of items displayed in the side region, in such a manner that the currently selected item is discriminated from another item among the plurality of items displaced in the side region; and after the item discriminating display means has discriminatively displayed the currently selected item for a prescribed time period, displaying a guidance, describing the currently selected item, in the side region closely to the currently selected item.

* * * * *